Figure 1:
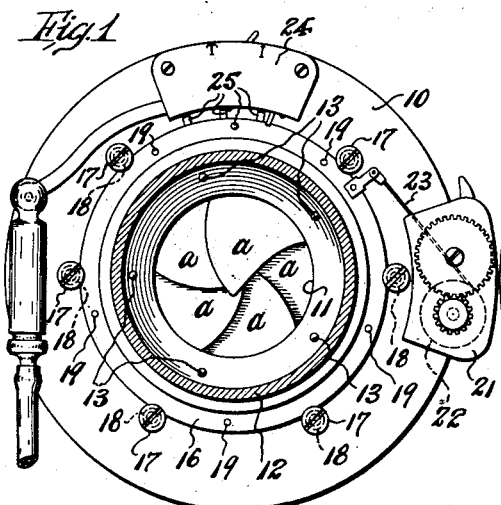

May 21, 1935.　　　G. L. COURSEN　　　2,002,109
PHOTOGRAPHIC SHUTTER
Filed March 16, 1934　　2 Sheets-Sheet 1

INVENTOR
George L. Coursen,
BY
George D. Richards
ATTORNEY

May 21, 1935.　　　G. L. COURSEN　　　2,002,109
PHOTOGRAPHIC SHUTTER
Filed March 16, 1934　　2 Sheets-Sheet 2
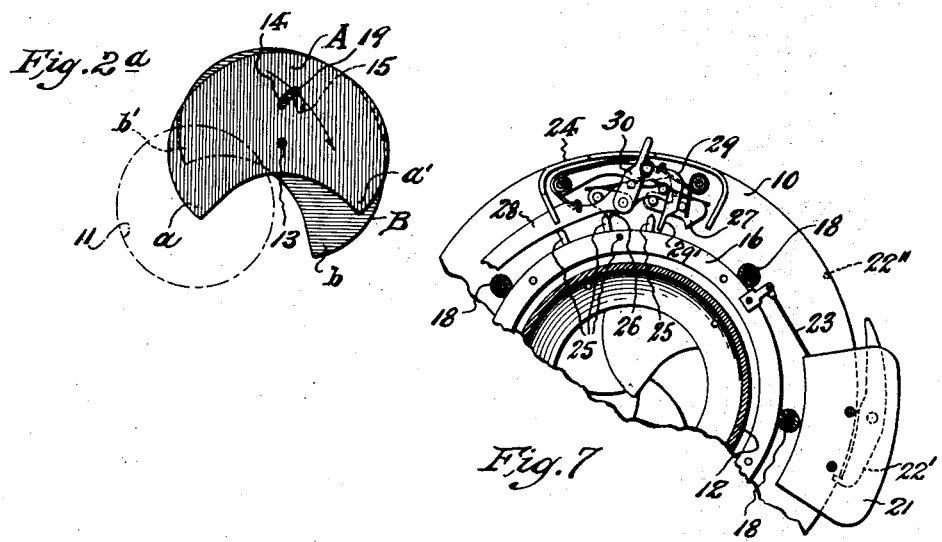
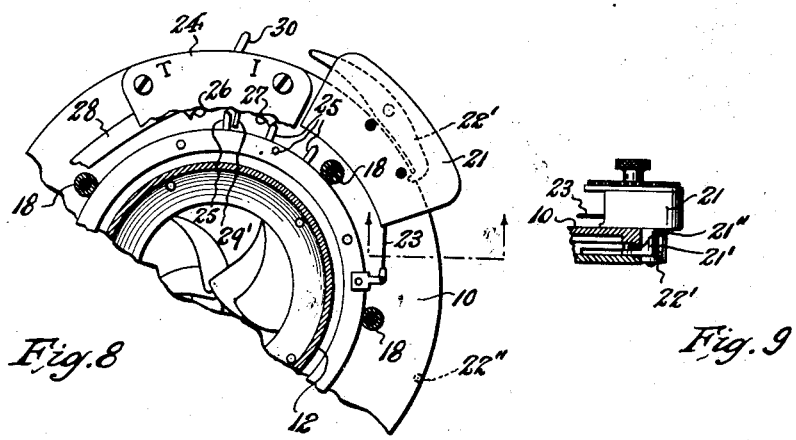
INVENTOR
George L. Coursen,
BY
George D. Richards
ATTORNEY Patented May 21, 1935

2,002,109

UNITED STATES PATENT OFFICE 2,002,109

PHOTOGRAPHIC SHUTTER

George L. Coursen, East Orange, N. J., assignor of one-half to H. Theodore Sorg, Newark, N. J.

Application March 16, 1934, Serial No. 715,850

6 Claims. (Cl. 95—63)

This invention relates to improvements in photographic shutters; and the invention has reference, more particularly, to the type of shutter comprising a series of pivoted crescentic shutter elements so related in grouped relation around the central light admission aperture of the shutter device, that, during their pivotal movements, the horns thereof will sweep the area of such aperture to effect opening and closing of the same; such type of shutter being of the general character shown and described in my prior United States Letters Patent, No. 718,983, dated January 27th, 1903.

The present invention has for its principal object to provide a novel photographic shutter, of the general type mentioned, wherein the crescentic shutter elements each comprise a pair of superimposed leaves mounted on a common fulcrum or pivot and actuated by a common driving pin carried by an actuating ring which pin is cooperative with a novel arrangement and relation of cam slots possessed by the leaves whereby the movement of the shutter elements is governed to produce accelerated opening and closing phases with a comparatively slower intermediate phase so that, in operations effecting instantaneous exposures, a maximum period of fully open aperture is attained without sacrifice of a given desired total duration of exposure. Such novel operation assures the attainment of maximum optical light or image transmission effects of the lenses employed over the entire area of the exposed photographic plate. The shutter according to this invention, by reason of its novel structure and mode of operation is also capable of exceedingly high velocities of instantaneous exposures.

Another object of this invention is to provide a novel construction and arrangement of shutter elements and actuating means therefor wherein the amplitude of the mechanical motions of the actuating means are reduced to a minimum, thus permitting high velocities of shutter movement with minimum mechanical stresses and jars.

Another object of this invention is to provide in combination with pivoted shutter leaves an actuating ring for operating the same, and an anti-friction support and guide for said ring.

Other objects of this invention, not at this time more particularly enumerated, will be understood from the following detailed description of the same.

Figure 2:
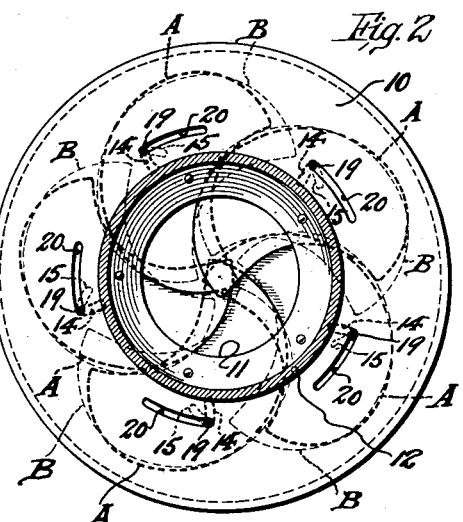
Figure 3:
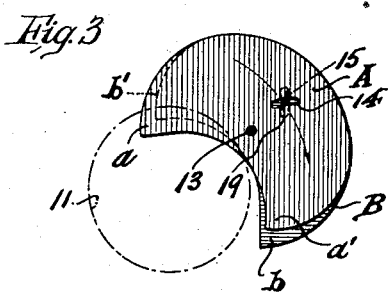
Figure 4:
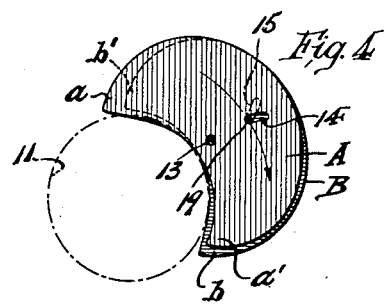
Figure 5:
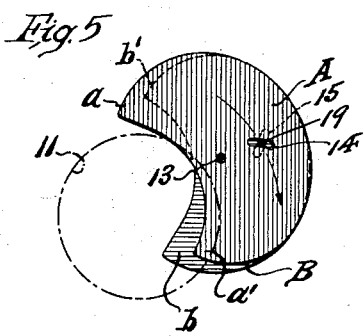
Figure 6:
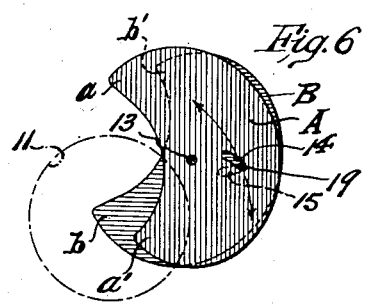

An illustrative embodiment of the invention is shown in the accompanying drawings, in which:

Fig. 1 is a front elevation of the shutter mechanism with the lens carrying barrel shown in transverse section; Fig. 2 is a similar view with the shutter actuating ring and control mechanism therefor removed, this view showing the shutter elements disposed in one of their light admission aperture closing positions; and Figs. 2a to 6 inclusive are face views of one pair of shutter leaves, said views respectively showing the initial and progressive stages of operative movement thereof in one direction relative to the light admission aperture, for opening and closing the latter. Fig. 7 is a fragmentary view somewhat similar to that of Fig. 1, but with parts in section to show underlying structure, and with the cover of the detent means for controlling time or instantaneous exposure manipulations of the shutter mechanism removed to show the details of such means. Fig. 8 is a fragmentary view somewhat similar to that of Fig. 7, but showing the actuating spring carriage shifted ready for a reverse operation of the shutter leaves; and Fig. 9 is a fragmentary sectional view showing the means for movably mounting the actuating spring carriage.

Similar characters of reference are employed in the above described views, to indicate corresponding parts.

Referring to said drawings, the reference character 10 indicates a shutter supporting plate, usually of circular form, which is adapted to be suitably mounted upon the front wall or lens board (not shown) of the camera to be served by the shutter mechanism. Said plate 10 is provided with a central light admission aperture 11, and concentric thereto is an outwardly projecting lens carrying barrel 12.

The shutter proper comprises a series of pivoted shutter leaf sets, the leaves of which are of substantially crescentic shape. The leaf sets are arranged in groups upon the inner face of the supporting plate 10 to lie about the aperture 11, the same being arranged in such manner as to successively overlap one upon another. Said leaf sets are adapted to be moved simultaneously about their respective pivots by means of pin and cam slot connections with a rotatable actuating ring. Each leaf set comprises a pair of leaves A and B superimposed one upon the other, and independently pivoted intermediate their end portions upon a common fulcrum post 13 which is suitably affixed to the shutter supporting plate 10. For convenience of description, the outer leaf i. e. the one next to the supporting plate surface, will be designated A, and the inner leaf which is superimposed thereon will be designated B. Preferably the leaves A and B are not symmetrically superimposed, but one leaf, as A, possesses an end portion or horn a somewhat advanced or off-set relative to the adjacent end portion or horn b' of the superimposed leaf B, while said superimposed leaf B possesses at its opposite extremity and end portion or horn b somewhat advanced or off-set relative to the adjacent end portion or horn *a'* of leaf A. The aperture 11 is completely closed by the end portions or horns *a—b'* of the leaf sets when the latter occupy the position shown in Fig. 2, from which position, when turned on their pivots in one direction, viz. clockwise, the same move through aperture opening position to an aperture closing position effected by the end portions or horns *b—a'* (see Fig. 6), and vice versa.

In the intermediate portion or body of leaf A, at a location outwardly off-set from its point of pivotal connection with a post 13, is formed an angularly disposed cam slot 14 inclining from its outer end to its inner end in an anti-clockwise direction. This cam slot 14 may be straight, but is preferably slightly bowed or curved, as shown. In like manner, in the intermediate portion or body of leaf B, at a location outwardly off-set from its point of pivotal connection with a post 13, is formed an angularly disposed cam slot 15 inclining from its outer end to its inner end in a clockwise direction. This cam slot 15 may likewise be straight, but is preferably slightly bowed or curved, as shown.

Movably mounted upon the outer face of said supporting plate 10, concentric to the lens carrying barrel 12, is a shutter leaf actuating ring 16. Journaled on headed bearing screws 17, which are spaced circumferentially about the path of movement of said actuating ring 16, are rollers 18 engageable by the outer circumference of said ring, to support and guide the rotative movements of the latter in a substantially frictionless manner. Carried by said actuating ring 16, to correspond in number to the number of shutter leaf sets, are inwardly projecting driving pins 19, which extend through arcuate slotways 20 provided in said supporting plate 10 to accommodate their operative movements. Each driving pin 19 extends through the cam slots 14—15 of each pair of shutter leaves A—B constituting a shutter leaf set.

To operate the shutter leaf sets, to effect by a continuous movement thereof in one direction the opening and closing of the aperture 11, the ring 16 is turned or rotated in one direction, e. g. a clockwise direction. To effect by a continuous movement thereof in the opposite direction an opening and closing of the aperture 11 by the leaf sets, the ring 16 is turned or rotated in an opposite or anti-clockwise direction. It will thus be obvious that by alternately rotating the actuating ring first in one direction and then in the other, the shutter leaf sets may be operated to repeatedly produce opening and closing effect upon the aperture 11. Any suitable means may be provided for supplying driving power to the actuating ring 16. Illustrative of one simple form of power supplying means, I have shown in Fig. 1 a carriage 21 which is movably related to the supporting plate 10 to be selectively set in the position shown therein for driving the ring 16 in clockwise direction, or set in an upwardly shifted position toward the top of the supporting plate (as shown in Fig. 8) for driving the ring 16 in the opposite or anti-clockwise direction, substantially similar arrangements being generally known to the art. This carriage 21 rides upon the face of a marginal portion of the supporting plate 10, being provided with a traction means 21' which embraces a marginal rib or guide lip 21" with which the supporting plate 10 is provided (see Fig. 9). The carriage is held in either of its shifted positions by a spring pressed releasable latch pawl 22', which is selectively engageable with cooperative stop notches 22" formed in the margin of the back portion of said supporting plate. Housed in this carriage 21 is a spring barrel 22 adapted to be operatively connected to the ring 16 by a flexible pull-tie 23. When the ring 16 occupies a position from which it can only rotate in a clockwise direction the carriage 21 is swung down to the lowered position shown in Fig. 1, whereby power exerting tension is stored in the spring barrel 22, effective, when the ring 16 is released from its detent means, to rotate the ring in desired clockwise direction. By swinging up the carriage 21 to raised position shown in Fig. 8, after completion of a clockwise movement of the ring 16, power exerting tension is again stored in the spring barrel 22 while at the same time the direction of extension of the pull-tie 23 is reversed, preparatory to movement of the ring in anti-clockwise direction, when the latter is again released from its detent means. It will also be apparent that any desired known form of actuating ring detent means 24 may be employed to cooperate with detent pins 25 carried by the ring; said means being preferably arranged, however, to permit of selective actuation of the ring for either time or instantaneous exposure operations of the shutter leaf sets, as is well understood by those skilled in the art. For the purpose of illustration, one form of such detent means 24 is shown in Fig. 7, the same comprising a pivoted detent dog 26 for checking clockwise movement of the actuating ring 16, and a second pivoted dog 27 for checking anti-clockwise movement of the latter. A pivoted release lever 28, which may be either pneumatically or manually manipulated, cooperates with said detent dogs 26 and 27 to release the same from ring restraining relation to the middle pin of the radial detent pins 25 projecting from the periphery of the ring 16. An additional pivoted detent lever 29 is provided with a stop projection 29' adapted to be disposed in or out of the path of the lateral detent pin 25 which projects outwardly from the face of the ring 16. A pivoted lift lever 30 is arranged, so that when moved to the right, as shown in Figs. 1 and 7, the detent lever 29 is engaged thereby and upheld against downward movement, so that its stop projection 29' is removed from the path of said last mentioned detent pin, but when said lift lever is moved to the left, said detent lever is freed therefrom so that it may swing down under control of the manipulated release lever 28, and thereby interpose its stop projection 29' in the path of said last mentioned detent pin. When the lift lever 30 is positioned to the right, and the detent lever 29 is thus rendered inoperative, the shutter mechanism is adapted to be actuated for an instantaneous exposure. Under such circumstances, assuming that the ring 16 is set for clockwise movement, the detent dog 26, by engagement with the middle radial pin 25, holds the ring machine under the urge of spring means 22. When, however, the release lever 28 is manipulated, said detent dog 26 is disengaged from said middle radial detent pin 25, and the ring completes a full shutter actuating stroke from left to right, at the end of which stroke said middle radial detent pin snaps under the detent dog 27, so as to restrain anti-clockwise movement of the ring after the spring carriage is shifted to a position adapted to energize the latter movement (see Fig. 8). Under the latter circumstances, the ring 16 may be released for full anti-clockwise movement by again manipulating of the release lever 28 so as to disengage the detent dog 27 from the described ring restraining relation. When the lift lever 30 is positioned to the left, it releases the detent lever 29 from inoperative condition, whereupon, assuming that the ring is set for clockwise movement, when the release lever 28 is manipulated to release the detent dog 26, the detent lever 29 will be simultaneously positioned to dispose its stop projection 29' in the path of the outwardly projecting lateral detent pin 25 of the ring. Clockwise movement of the ring 16 is arrested by the engagement of the lateral detent pin 25 by the stop projection 29', until the detent dog 26 returns to normal position, in which position it is engaged by the right hand radial detent pin 25, thus holding the ring stationary at mid-flight, and thereby holding the shutter leaves stationary in full aperture exposing position, until the ring is again released to complete its full stroke movement by a succeeding manipulation of the release lever 28 adapted to disengage said detent dog 26 from said right hand radial detent pin. By this mode of operation time exposure actuation of the shutter mechanism is attainable. The same sequence of operations for time exposure occur on a succeeding movement of the ring in anti-clockwise direction, except that the checking of the ring in mid-flight is accomplished by the engagement of the left hand radial detent pin 25 with the detent dog 27.

The operation of the shutter-leaf sets, whereby accelerated opening and closing phases of operative movement thereof relative to the aperture 11, is as follows:

Assuming that the shutter-leaf sets occupy an aperture closing position from which they are to be moved by a clockwise rotation of the actuating ring 16, such position being shown in Figs. 1 and 2. In such closing position, the aperture 11 is covered by end portions or horns a—b' of the respective pairs of leaves A—B of the shutter leaf sets. When the leaves A—B are in this closed position, the driving pins 19 are engaged in the outer ends of the cam slots 14—15 of the superimposed leaves A—B of the shutter leaf sets. In Figs. 3 to 6 inclusive, successive positions of but a single set of shutter leaves are shown to illustrate the novel and characteristic movements thereof as they pass from the above mentioned aperture closing position through full aperture opening position to another aperture closing position; it will be obvious, however, that each set of leaves pass simultaneously through corresponding movements, when actuated by the power transmitting actuating ring 16. Considering therefore the motions of one pair or sets of leaves A—B as typical of that of all said sets, as the actuating ring 16 moves the driving pin 19 in clockwise direction, said driving pin moves against the side of the cam slot 14 of leaf A, which cam slot 14 is, in the assumed starting position of leaf movement, inclined in a direction opposite to or away from the direction of driving pin movement, while at the same time said driving pin moves against the side of the cam slot 15 of leaf B, which cam slot initially is inclined in the same direction as the direction of driving pin movement. By reason of these conditions, the movement of the driving pin 19 in and against cam slot 14 effects a camming movement of leaf A in addition to the direct propulsive effect of the driving pin travel, while the movement of the driving pin in and against cam slot 15 effects a loss or reduction of movement of leaf B relative to the direct propulsive effect of the driving pin travel. Such effects result in an accelerated or relatively fast movement of the end portion or horn a of leaf A compared with that of the end portion or horn b' of leaf B, as these swing outwardly of the area of aperture 11, see Fig. 3. This relative movement of leaves A and B continues until the same clear the area of aperture 11, and occupy aperture opening position shown in Fig. 4, by which time the normally advanced or off-set end-portion of horn a of leaf A has practically overtaken the end-portion or horn b' of leaf B, while the driving pin 19 has reached the lower or inner ends of the respective cam-slots 14—15 of said leaves A—B. It will be obvious that for a relatively appreciable time during which the driving pin 19 enters and leaves the inner ends of the cams-slots 14—15, that the leaves A—B (then occupying full aperture opening position) will travel together at substantially equal speed under substantially unmodified propulsive thrust of the driving pin movement alone. This occurring as the driving pin crosses a line radial to the center of the aperture 11 and extended through the fulcrum point of leaf movement. When this line is crossed, the driving pin 19 tends to move outwardly in the cam-slots 14—15, with the consequence that the cam slot 15 of leaf B is so shifted that it now tends to occupy a position inclined in a direction opposite to or away from the direction of driving pin movement, while the cam slot 14 of leaf A is so shifted that it tends to occupy a position inclined in the same direction as the direction of driving pin movement. By reason of these changed conditions, continued movement of the driving pin 19 effects a camming movement of leaf B in addition to the direct propulsive effect of the driving pin travel, while a loss or reduction of movement of leaf A occurs relative to the direct propulsive effect of the driving pin travel. The resultant of these effects is that there occurs an accelerated or relatively fast movement of the end portion or horn b of leaf B compared with that of the end portion of horn a' of leaf A, as these parts of the leaves move into the area of the aperture, see Fig. 5. This relative movement of the leaves A and B continues until the same occupy complete aperture closing position shown in Fig. 6, by which time driving pin 19 has again reached the upper or outer ends of the respective cam slots 14—15 of the leaves. After attainment of the aperture closing position shown in Fig. 6, the shutter leaves are disposed for aperture opening and closing movements under propulsion effects of the actuating ring 16, when the latter is next moved in anti-clockwise direction. It will be obvious, without further illustration or additional description, that the leaves, when they are thus again moved, will produce the accelerated opening and closing movement phases with an intermediate slower movement or relative dwell at aperture open position similar to that above described in detail, but in opposite direction and relations.

From the above description it will be ascertained, that a novel photographic shutter movement is provided by the present invention whereby the shutter leaves operate with an accelerated opening movement, a retarded aperture exposing movement, and a final accelerated closing movement, the effect of which is to assure maximum light or image transmission by the lens under control of the shutter, while at the same time the shutter, by reason of its mechanical structure and novel mode of operation is also capable of high speed actuation to attain high velocities of instantaneous exposures.

As many changes could be made in the herein disclosed photographic shutter structure, and many apparently widely different embodiments of this invention could be made without departing from the scope thereof, as defined by the following claims, it is intended that all matter contained in the above description or shown in the accompanying drawings shall be interpreted as illustrative and not in a limiting sense.

I claim:—

1. In a photographic shutter, a supporting means having an aperture, shutter leaf sets arranged around and cooperative with said aperture, means for actuating said leaf sets, each leaf set comprising a pair of superimposed leaves independently pivoted upon a common fulcrum means, and driving pin and cam slot connections between the actuating means and the leaves of each set adapted to produce simultaneous differential movement phases of said leaves whereby the sets operate with an accelerated opening movement, a relatively retarded aperture exposing movement and a final accelerated closing movement.

2. In a photographic shutter, a supporting means having an aperture, overlapping shutter leaf sets arranged around and cooperative with said aperture, a rotative actuating ring, each leaf set comprising a pair of superimposed leaves independently pivoted upon a common fulcrum means, one leaf of each set having a cam slot inclined in one direction and the other leaf of each set having a cam slot inclined in the opposite direction, and driving pins carried by said actuating ring with which the cam slots of each pair of leaves are respectively mutually engaged.

3. In a photographic shutter, a supporting means having an aperture, overlapping shutter leaf sets arranged around and cooperative with said aperture, a rotative actuating ring concentric to said aperture, said ring being mounted on the exterior face of said supporting means, power supply means for operating said ring, detent means for controlling the operation of said ring, each leaf set comprising a pair of superimposed leaves independently pivoted upon a common fulcrum means affixed to said supporting means, driving pin and cam slot connections between the actuating ring and the leaves of each set adapted to produce differential movement phases of said leaves whereby the sets operate with an accelerated opening movement, a relatively retarded aperture exposing movement and a final accelerated closing movement, and said supporting means having slotways to accommodate said driving pin means.

4. In a photographic shutter, a supporting means having an aperture, overlapping shutter leaf sets arranged around and cooperative with said aperture, a rotative actuating ring concentric to said aperture, said ring being mounted on the exterior face of said supporting means, power supply means for operating said ring, detent means for controlling the operation of said ring, each leaf set comprising a pair of superimposed leaves independently pivoted upon a common fulcrum means affixed to said supporting means, one leaf of each set having a cam slot inclined in one direction and the other leaf of each set having a cam slot inclined in the opposite direction, driving pins carried by said actuating ring with which the cam slots of each pair of leaves are respectively mutually engaged, and said supporting means having slotways to accommodate said driving pins.

5. In a photographic shutter, a supporting means having an aperture, overlapping shutter leaf sets arranged around and cooperative with said aperture, a rotative actuating ring, each leaf set comprising a pair of superimposed leaves independently pivoted upon common fulcrum means affixed to said supporting means, each leaf being of substantially crescentic form with its concave margin disposed toward said aperture, the body of one leaf of each set having a cam slot inclined in one direction and the body of the other leaf having a cam slot inclined in the opposite direction, said cam slots lying intermediate the pivot points of the leaves and the outer convex margins thereof, and driving pins carried by said actuating ring with which the cam slots of each pair of leaves are respectively mutually engaged, whereby during certain phases of shutter leaf set operation, a driving pin will effect by a camming action upon the cam slot of one leaf an excess of movement thereof relative to the other leaf in addition to the direct propulsion effect of said driving pin upon said leaves, thereby to produce accelerated aperture opening and closing movement of said leaf sets with relatively slower intermediate movements of the latter at full aperture exposing positions.

6. In a photographic shutter, a supporting means having an aperture, overlapping shutter leaf sets arranged around and cooperative with said aperture, a rotative actuating ring, each leaf set comprising a pair of superimposed leaves independently pivoted upon common fulcrum means affixed to said supporting means, each leaf being of substantially crescentic form with its concave margin disposed toward said aperture, said leaves being so mutually related that the horn at one extremity of one leaf is somewhat off set relative to the adjacent horn at the corresponding extremity of the other leaf, while the horn at the opposite extremity of said other leaf is somewhat off set relative to the adjacent horn at the corresponding extremity of the one leaf, the body of one leaf of each set having a cam slot inclined in one direction and the body of the other leaf having a cam slot inclined in the opposite direction, said cam slots lying intermediate the pivot points of the leaves and the outer convex margins thereof, and driving pins carried by said actuating ring with which the cam slots of each pair of leaves are respectively mutually engaged, whereby, during certain phases of shutter leaf set operation, a driving pin will effect by a camming action upon the cam slot of one leaf an excess of movement thereof relative to the other leaf in addition to the direct propulsion effect of said driving pin upon said leaves, thereby to produce accelerated aperture opening and closing movements of said leaf sets with relatively slower intermediate movements of the latter at full aperture exposing positions.

GEORGE L. COURSEN.